United States Patent [19]

Miyano et al.

[11] Patent Number: 5,644,358
[45] Date of Patent: Jul. 1, 1997

[54] AUTOMATIC WHITE BALANCE ADJUSTING DEVICE

[75] Inventors: Toshiki Miyano; Eiichi Shimizu, both of Yokohama, Japan

[73] Assignee: Eastman Kodak Comany, Rochester, N.Y.

[21] Appl. No.: 561,589

[22] Filed: Nov. 21, 1995

[30]   Foreign Application Priority Data

Mar. 7, 1995   [JP]   Japan ..................................... 7-046812

[51] Int. Cl.⁶ ..................................................... H04N 9/73
[52] U.S. Cl. ........................... 348/223; 348/226; 348/655
[58] Field of Search ..................................... 348/223, 225, 348/226, 655; 358/25; H04N 9/73

[56]   References Cited

U.S. PATENT DOCUMENTS

| 4,584,598 | 4/1986 | Kutaragi | 348/226 |
| 4,736,241 | 4/1988 | Murakami . | |
| 4,989,093 | 1/1991 | Kaneko | 348/226 |
| 5,010,394 | 4/1991 | Murao | 348/226 |

FOREIGN PATENT DOCUMENTS

| 5007369 | 1/1993 | Japan . |
| 5292533 | 11/1993 | Japan . |

*Primary Examiner*—Sherrie Hsia
*Attorney, Agent, or Firm*—David M. Woods

[57]   ABSTRACT

An automatic white balance adjusting device adjusts the white balance of a white object which is indoors under the influence of bright sunlight, or a white object which is indoors under the influence of dull sunlight light and a fluorescent lamp. The device includes a weighting circuit for a fluorescent lamp block, and a weighting circuit for a sunlight-and-tungsten-lamp block. The former weights an average of the fluorescent lamp block, while the latter weights an average of the sunlight-and-tungsten-lamp block. The weighted averages are used to generate a white balancing signal, which will be used for white balancing a white object.

2 Claims, 3 Drawing Sheets

AUTOMATIC WHITE BALANCE ADJUSTING DEVICE

BACKGROUND OF THE INVENTION

1. Field of the Invention

This invention relates to an automatic white balance adjusting device for an electronic still camera, a video camera, or the like.

2. Description of the Prior Art

Usually, white balance adjustment is performed in a video camera so as to correctly reproduce white objects as white. In the prior art, white balance adjustment is performed such that an average of data in a video signal per frame indicates an achromatic color. However, when most of an image is chromatic, a white object tends to be erroneously white-balanced in this method. This phenomenon is called "color failure". To overcome this problem, there have been proposed a number of white balance adjusting methods. One of them is disclosed in Japanese Patent Laid-Open Publication No. Hei 5-292,533. In this method, a video signal is divided into a plurality of blocks, representative values of predetermined areas in the blocks are white-balance adjusted such that an average of these representative values represents an achromatic color. Japanese Patent Laid-Open Publication No. Hei 5-007,369 proposes a method in which a limited number of white balancing signals are used so as to white-balance images in a limited range.

A white object which is present indoors under a fluorescent lamp tends to be reproduced as a greenish white color. Thus, it is difficult to distinguish such a greenish white object from green turf under daylight. Color failure tends to occur in such a case. The method of the second cited reference can prevent the color failure in this case. Specifically, it is checked, according to the brightness of the object, whether the object is present outdoors or indoors.

U.S. Pat. No. 4,736,241 discloses a white balance adjusting method, in which a white balance adjusting signal is weakened if a color temperature is very low in sunset when it is difficult for the human eyes to adapt.

However, the conventional white balance adjusting methods do not seem to have paid any attention to the following problems.

In Japanese Patent Laid-Open Publication No. Hei 5-007, 369, if an object is in a dimly lit room without any artificial light source such as a fluorescent lamp, but bright sunlight is incident into the room via a window, the object is judged to be indoors. Then, the white balance adjustment is performed assuming that the object is indoors under a fluorescent or tungsten lamp. However, no white balance adjustment is conducted with respect to bright sunlight. Further, when two light sources such as a fluorescent lamp and sunlight are present, the object is simply considered to be present indoors. In such a case, the white balance adjustment is performed with respect to the fluorescent or tungsten lamp, which does not seem appropriate for the object.

If the white balance adjustment of U.S. Pat. No. 4,736,241 is applied to the Japanese Patent Laid-Open Publication No. Hei 5-292,533, when the object under dull sunlight is illuminated by the fluorescent lamp, the white balance adjustment is performed to remove the influence of the fluorescent lamp. This means that the white balance adjusting signals is weakened, and that the white balance adjustment is not precise.

SUMMARY OF THE INVENTION

It is an object of the invention to provide a white balance adjusting device which can overcome the foregoing problems of the prior art, and more particularly to provide a white balance adjusting device which can appropriately perform the white balance adjustment not only when an object is present in a room and is under the influence of bright sunlight but also when the object is under the influence of dull sunlight and a fluorescent lamp.

According to the invention, there is provided a white balance adjusting device, comprising: a block representative value calculating circuit for dividing a video signal into a plurality of blocks and for calculating representative values of the divided blocks; a fluorescent lamp block average calculating circuit for calculating an average of the representative values of the blocks where the video signal represents a substantially white object under a fluorescent lamp; a sunlight-and-tungsten-lamp block average calculating circuit for calculating an average of the representative values of the blocks where the video signal represents a substantially white object under daylight and a tungsten lamp; a fluorescent lamp block weighting circuit for receiving the fluorescent lamp block average and object brightness, and multiplying a weighting coefficient, predetermined on the basis of the object brightness, with the fluorescent block average; a sunlight-and-tungsten-lamp block weighting circuit for receiving the sunlight-and-tungsten-lamp average, and multiplying a weighting coefficient, predetermined on the basis of the sunlight-and-tungsten-lamp block average, with the sunlight-and-tungsten-lamp average; a white balance adjusting signal calculating circuit for mixing the weighted fluorescent lamp block average and the weighted sunlight-and-tungsten-lamp block average in accordance with a ratio of the fluorescent lamp blocks and the sunlight-and-tungsten-lamp blocks which are weighted by the weighting coefficients, so as to generate a white balance adjusting signal; and a white balance adjusting circuit for performing white balance adjustment in response to the white balance adjusting signal.

DESCRIPTION OF THE PREFERRED EMBODIMENT

Figure 1:
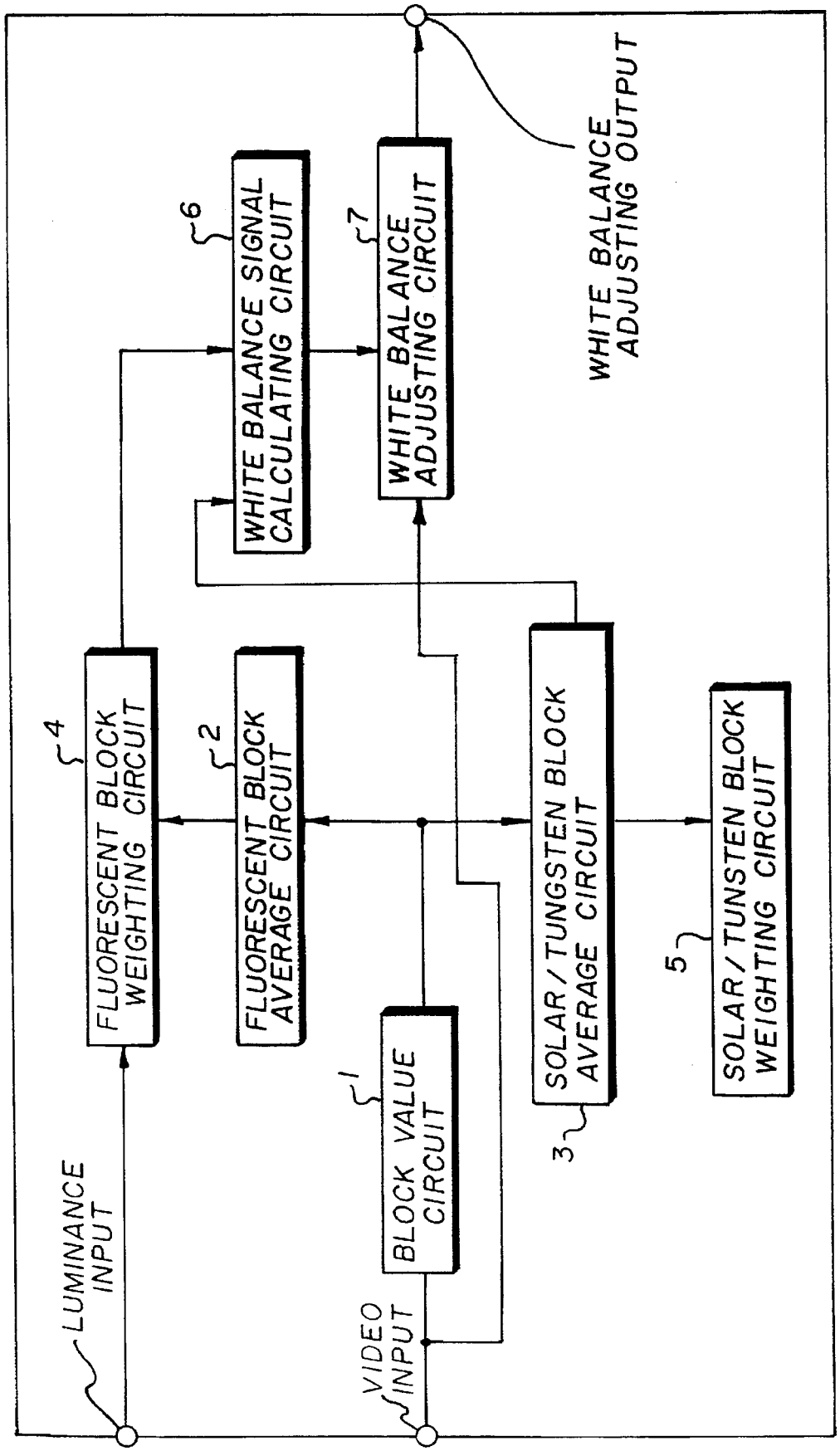
FIG. 1 is a block diagram showing the configuration of a white balance adjusting device according to the invention.

Referring to FIG. 1, a white balance adjusting device comprises a block representative value calculating circuit 1, a fluorescent lamp block average calculating circuit 2, a sunlight-and-tungsten-lamp block average calculating circuit 3, a weighting circuit 4 for the fluorescent lamp block, a weighting circuit 5 for the sunlight-and-tungsten-lamp block, a white balance signal calculating circuit 6, and a white balance adjusting circuit 7.

The block representative value calculating circuit 1 divides a video signal into a plurality of blocks, and calculates representative values of the divided blocks. This circuit 1 is connected to a video signal input terminal.

The fluorescent lamp block average calculating circuit 2 calculates an average of the representative values of the blocks which belong to an area where the video signal is indicative of a substantially white object under the fluorescent lamp.

The sunlight-and-tungsten-lamp block average calculating circuit 3 calculates an average of the representative values of the blocks which belong to an area where the video signal is indicative of a white object under daylight or tungsten lamp.

The weighting circuit 4 for the fluorescent lamp blocks receives the average of the fluorescent lamp blocks and the brightness of the object, and multiplies a weighting coefficient by the fluorescent lamp block average. A number of weighting coefficients have been determined in accordance with the brightness of the object beforehand. The weighting circuit 4 is connected to an object brightness input terminal.

The weighting circuit 5 for the sunlight and tungsten lamp receives a sunlight-and-tungsten-lamp block average, and multiplies a weighting coefficient by the foregoing average. A number of weighting coefficients have been determined in accordance with the sunlight-and-tungsten-lamp block average.

The white balance signal calculating circuit 6 mixes the weighted fluorescent lamp block average and the weighted sunlight-and-tungsten-lamp block average in accordance with a ratio of the number of weighted fluorescent lamp blocks to the number of weighted sunlight-and-tungsten-lamp blocks. Thus, a white balance signal is generated.

The white balance adjusting circuit 7 adjusts the white balance in response to the white balance signal. This circuit is connected to a white balance signal output terminal.

Figure 2:
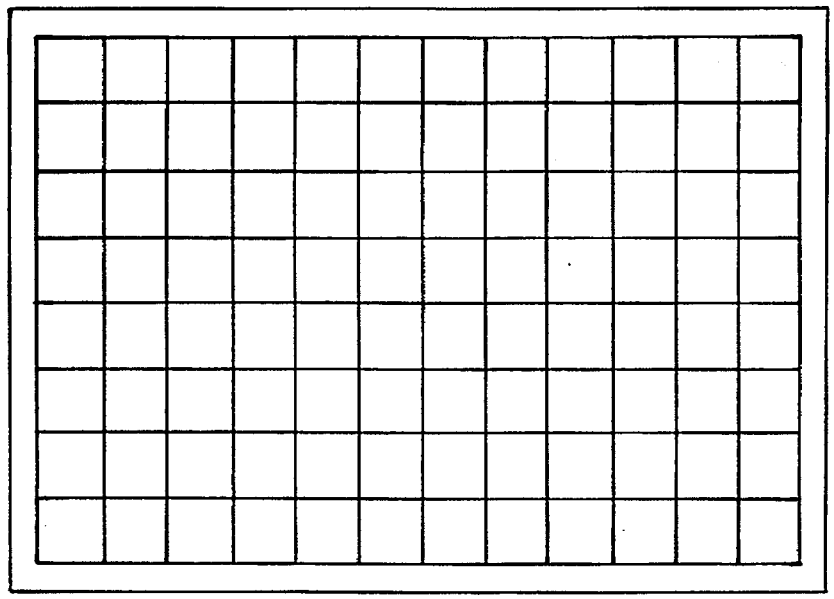
FIG. 2 shows how a video signal is divided into blocks.

In operation, first of all, the block representative value calculating circuit 1 receives a video signal (indicative of red R, green G or blue B), and divides it into a plurality of blocks as shown in FIG. 2. Then, the circuit 1 calculates representative values of the divided blocks in accordance with the received video signal. An average of data (R, G, B) in the video signal for pixels in a block is used as the block representative value. Alternatively, the block representative values may be averages of pixels sampled in the block, an average of different areas in the block, a central value of the block, or the most frequent value in the block.

Figure 3:
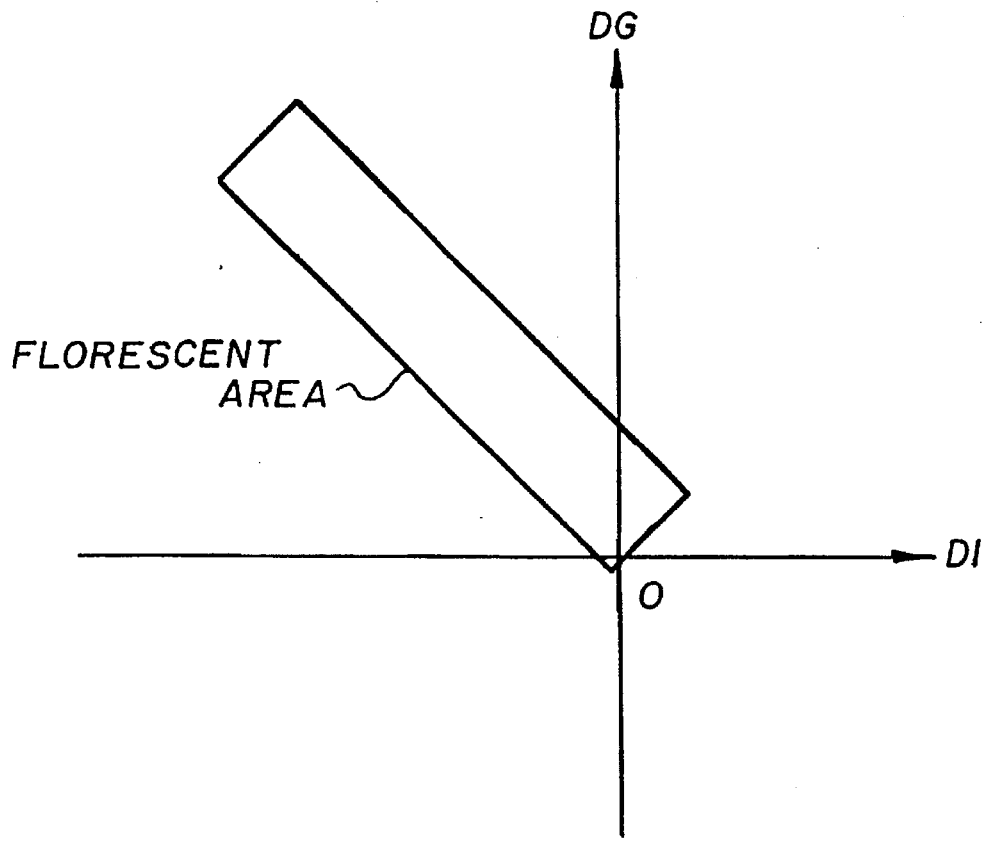
FIG. 3 is a DG-DI plan view showing a distribution of elements, in a video signal, indicative of a white object under a fluorescent lamp.

In a second step, the calculated block representative values are supplied to the fluorescent lamp block average calculating circuit 2. The circuit 2 selects blocks which belong to an area where the video signal represents a substantially white object under a fluorescent lamp. An average of representative values of the selected blocks is calculated as a fluorescent lamp average. FIG. 3 shows an example of an area where a video signal represents a substantially white object under a fluorescent lamp. Blocks are selected within a rectangular area. In FIG. 3, the ordinate DG and the abscissa DI are expressed by the following formulas.

$$DG=(2*G-R-B)/4$$

$$DI=(B-R)/2$$

Figure 4:
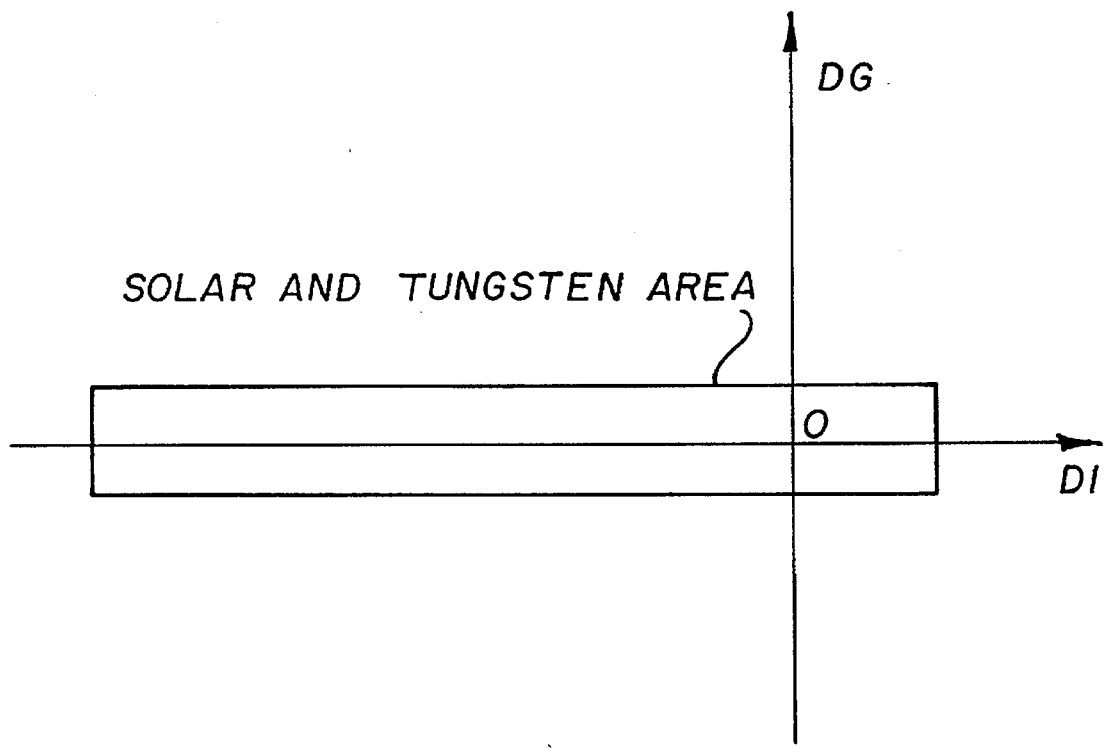
FIG. 4 is a view similar to FIG. 3, but showing the distribution of elements, in a video signal, indicative of a white object under daylight and a tungsten lamp.

The calculated block representative values are input in the sunlight-and-tungsten-lamp block average calculating circuit 3, which selects blocks belonging to an area where a video signal represents a substantially white object under daylight or a tungsten lamp. Then, the circuit 3 calculates an average of the representative values of the selected blocks. FIG. 4 shows an area where a video signal represents the substantially white object under daylight or the tungsten lamp. The blocks are selected in the shape of a rectangle. The ordinate DG and the abscissa DI in FIG. 4 are expressed by the foregoing formula.

In a third step, the fluorescent lamp block average and object brightness are input to the weighting circuit 4 for the fluorescent lamp block. The weighting circuit 4 multiplies a weighting coefficient by the object brightness. A number of weighting coefficients have been determined in accordance with the object brightness.

A saturation S is expressed by the following formula:

$$S=DG*DG+DI*DI$$

$$DG=(2*G-R-B)/4$$

$$DI=(B-R)/2$$

where BV denotes the object brightness, (R_F, G_F, B_F) denotes an average of the representative values of the fluorescent lamp blocks, S_F denotes a saturation of the fluorescent lamp block average, (R_D, G_D, B_D) denotes an average of the representative values of the sunlight-and-tungsten-lamp blocks, and S_D denotes a saturation of the sunlight-and-tungsten-lamp block average.

A weighting coefficient W_F for the fluorescent lamp block is set to a small value so as to prevent a color failure of green turf under bright sunlight when the object brightness BV is large. For instance, decisions are made according to the following rules.

(1) If $BV<BV0$, W_F=1.0.

(2) If $BV0 \leq BV < BV1$, W_F=0.75.

(3) If $BV1 \leq BV < BV2$, W_F=0.5.

(4) If $BV2 \leq BV < BV3$, W_F=0.25.

(5) If $BV3 \leq BV$, W_F=0.0.

where BV0, BV1, BV2 and BV3 are thresholds determined beforehand, and $BV0<BV1<BV2<BV3$.

The weighting coefficient will be set to 1, also by using the saturation S_F, regardless of the object brightness so long as the saturation is sufficiently small.

(1) If $S\_F<S0\_F$, W=1.0.

(2) If $S\_F \geq S0\_F$ and $BV<BV0$, W_F=1.0.

(3) If $S\_F \geq S0\_F$ and $BV0 \leq BV<BV1$, W_F=0.75.

(4) If $S\_F \geq S0\_F$ and $BV1 \leq BV<BV2$, W_F=0.5.

(5) If $S\_F \geq S0\_F$ and $BV2 \leq BV<BV3$, W_F=0.25.

(6) If $S\_F \geq S0\_F$ and $BV \leq BV$, W_F=0.0.

In the foregoing formulas, S0_F denotes a threshold determined beforehand.

The larger the saturation, the smaller the weighting coefficient may be set. Alternatively, a specific function f (R_F, G_F, B_F, BV) may be applied using the fluorescent lamp block average (R_F, G_F, B_F) and the object brightness BV as variables.

When the object brightness is low, the weighting coefficient W_F is calculated such that the white balance adjustment is performed so as to remove influences of the fluorescent lamp. If the object brightness is high, the white balance is performed so as to remove influences of the fluorescent lamp block since a white object might be turf under bright sunlight.

The sunlight-and-tungsten-lamp block average is input to the weighting circuit 5 for the sunlight-and-tungsten-lamp block. This circuit 5 multiplies one of a number weighting coefficients with the sunlight and tungsten lamp block average. The weighting coefficients will be described hereinafter.

For instance, if the saturation S_D is large, the weighting coefficient W_D will be set small. The following rule is applicable:

(1) If $S\_D<S0\_D$, W_D=1.0.

(2) If $S\_D \geq S0\_D$, W_D=0.5.

In this case, S0_D denotes a threshold determined beforehand. This rule is only an example, and any other rule is also applicable. For instance, without using the saturation S_D, a specific function f (R_D, G_D, B_D) may be applied using, as a variable, the sunlight-and-tungsten-lamp block average (R_D, G_D, B_D).

The white balance adjustment is moderately performed by calculating the weighting coefficient W_D of the daylight and tungsten lamp when it is difficult for a person to adapt his or her eyes to sunset.

In a fourth step, the weighting coefficient W_F for the fluorescent lamp block average, and the weighting coefficient W_D for the daylight and tungsten lamp are input to the white balance signal calculating circuit 6. The circuit 6 mixes these two weight coefficients W_F and W_D in accordance with the number of fluorescent blocks and the sunlight-and-tungsten-lamp blocks. A white balance signal is generated according to the mixed signals. The following relationship is established.

M_F=W_F*CNT_F/(W_F*CNT_F+W_D*CNT_D)

M_D=W_D*CNT_D/(W_F*CNT_F+W_D*CNT_D)

Rmix=M_F*R_F+M_D*R_D

Gmix=W_F*G_F+M_D*G_D

Bmix=M_F*B_F+M_D*B_D where M_F denotes a mixing ratio of the fluorescent lamp blocks, M_D denotes a mixing ratio of the sunlight-and-tungsten-lamp blocks, Rmix and Gmix denote mixed signals, CNT_D denotes the number of the sunlight-and-tungsten-lamp blocks, (R_F, G_F, B_F) denotes a fluorescent lamp block average, and (R_D, G_D, B_D) denotes a sunlight-and-tungsten-lamp block average. The white balance signal can be determined using Gmix-Rmix and Gmix-Bmix.

In the final step, the white balance signal is input to the white balance adjusting circuit 7, which adds this signal to R and B of all the pixels. Thus, the white balance adjustment is carried out.

Alternatively, the white balance adjustment can be performed by adding a white balance signal (MAX-Rmix, MAX-Gmix, and MAX-Bmix) to R, G and B of all the pixels, assuming that the white balance signal is MAX=max (Rmix, Gmix, Bmix).

The white balance adjusting device of the invention is effective in performing appropriate white balance adjustment not only when an object is indoors under bright sunlight but also when the object is under the influence of dull sunlight and a fluorescent lamp.

What is claimed is:

1. An automatic white balance adjusting device comprising:
   (a) a block representative value calculating circuit for dividing a video signal into a plurality of blocks and for calculating representative values of the divided blocks;
   (b) a fluorescent lamp block average calculating circuit for calculating a fluorescent lamp block average of the representative values of the blocks where the video signal represents a substantially white object under a fluorescent lamp;
   (c) a sunlight-and-tungsten-lamp block average calculating circuit for calculating a sunlight-and-tungsten-lamp block average of the representative values of the blocks where the video signal represents the substantially white object under bright sunlight and a tungsten lamp;
   (d) a fluorescent lamp block weighting circuit for receiving the fluorescent lamp block average and object brightness, and multiplying one of a number of fluorescent weighting coefficients, predetermined on the basis of the object brightness, by the fluorescent lamp block average to generate a weighted fluorescent lamp block average;
   (e) a sunlight-and-tungsten-lamp block weighting circuit for receiving the sunlight-and-tungsten-lamp block average, and multiplying one of a number of daylight weighting coefficients, predetermined on the basis of the sunlight-and-tungsten-lamp block average, by the sunlight-and-tungsten-lamp block average to generate a weighted sunlight-and-tungsten-lamp block average;
   (f) a white balance adjusting signal calculating circuit for mixing the weighted fluorescent lamp block average and the weighted sunlight-and-tungsten-lamp block average in accordance with a ratio of fluorescent lamp blocks and sunlight-and-tungsten-lamp blocks which are weighted by the fluorescent and daylight weighting coefficients, so as to generate a white balance adjusting signal; and
   (g) a white balance adjusting circuit for performing white balance adjustment in response to the white balance adjusting signal.

2. An automatic white balance adjustment method comprising the steps of:
   (a) generating a block representative value by dividing a video signal into a plurality of blocks and calculating representative values of the divided blocks;
   (b) calculating a fluorescent lamp block average of the representative values of the blocks where the video signal represents a substantially white object under a fluorescent lamp;
   (c) calculating a sunlight-and-tungsten-lamp block average of the representative values of the blocks where the video signal represents the substantially white object under bright sunlight and a tungsten lamp;
   (d) generating a weighted fluorescent lamp block average by receiving the fluorescent lamp block average and object brightness, and multiplying one of a number of fluorescent weighting coefficients, predetermined on the basis of the object brightness, by the fluorescent lamp block average;
   (e) generating a weighted sunlight-and-tungsten-lamp block average by receiving the sunlight-and-tungsten-lamp block average, and multiplying one of a number of daylight weighting coefficients, predetermined on the basis of the sunlight-and-tungsten-lamp block average, by the sunlight-and-tungsten-lamp block average;
   (f) generating a white balance adjusting signal by mixing the weighted fluorescent lamp block average and the weighted sunlight-and-tungsten-lamp block average in accordance with a ratio of fluorescent lamp blocks and sunlight-and-tungsten-lamp blocks which are weighted by the fluorescent and daylight weighting coefficients and
   (g) performing the white balance adjustment in response to the white balance adjusting signal.

* * * * *